(12) United States Patent
Kawaguchi et al.

(10) Patent No.: US 6,619,667 B2
(45) Date of Patent: Sep. 16, 2003

(54) SEALING STRUCTURE

(75) Inventors: Hiromasa Kawaguchi, Akaho Komagane (JP); Koichi Kusakawa, Akaho Komagane (JP)

(73) Assignee: NHK Spring Co., Ltd. (JP)

( * ) Notice: Subject to any disclaimer, the term of this patent is extended or adjusted under 35 U.S.C. 154(b) by 47 days.

(21) Appl. No.: 09/859,744

(22) Filed: May 17, 2001

(65) Prior Publication Data

US 2002/0008357 A1 Jan. 24, 2002

(30) Foreign Application Priority Data

May 19, 2000 (JP) .............................. 2000-148253

(51) Int. Cl.[7] .......................... F16J 15/02; G11B 33/14
(52) U.S. Cl. ..................................... 277/628; 360/97.02
(58) Field of Search .......................... 277/628; 360/97.02

(56) References Cited

U.S. PATENT DOCUMENTS

| | | | | |
|---|---|---|---|---|
| 4,477,636 A | * | 10/1984 | Muroi et al. | 156/332 |
| 4,790,544 A | * | 12/1988 | Kemp | 277/314 |
| 5,696,648 A | * | 12/1997 | Jeong et al. | 360/97.02 |
| 5,730,446 A | * | 3/1998 | Taylor et al. | 277/312 |
| 6,142,483 A | * | 11/2000 | Bryant, III | 277/598 |
| 6,302,321 B1 | * | 10/2001 | Reese et al. | 229/123.1 |

* cited by examiner

Primary Examiner—Anthony Knight
Assistant Examiner—E Peavey
(74) Attorney, Agent, or Firm—McGlew and Tuttle, P.C.

(57) ABSTRACT

A sealing structure for sealing a region of an article to be sealed, comprising a fixed form sealing material bonded to the region with an isocyanate group containing reactive polyurethane hot-melt adhesive.

8 Claims, 5 Drawing Sheets

SEALING STRUCTURE

BACKGROUND OF THE INVENTION

1. Field of the Invention

The present invention relates to a sealing structure for sealing a region of an article to be sealed (hereinafter, sometimes referred to simply as a seal region) utilizing a fixed form sealing material used for making the article airtight and waterproof, or airtight and moistureproof. More particularly, the present invention relates to a sealing structure for a seal region using an isocyanate group containing reactive polyurethane adhesive in the case where a fixed-form sealing material is applied to seal regions of an air conduct joint, a seam between the tail lamp and chassis of a car, a joint of the cool air conveying duct of a refrigerator, contact surface of the casing and lid of a hard disk driving case, and the like.

2. Description of the Related Art

By the term "fixed form sealing material" is meant a sealing material that is already given a predetermined shape in advance before use. This term is used to distinguish it as a sealing material that has already a fixed form prior to use in contrast to a liquid sealing material such as a liquid type caulking material or a liquid type sealing material that is liquid and will be cured or have a fixed form only after being applied. The fixed form material includes those sealing materials made of rubber or plastic and molded into a predetermined configuration, those made of rubber or plastic and molded into a sheet of plate that is then punched into a predetermined shape.

Upon application of such fixed form sealing materials to the seal region as described above, generally a method is used in which a pressure-sensitive adhesive in the form of a tape with a release paper on each surface, i.e., a so-called double coated tape, is applied to one surface of a fixed form sealing material and the release paper is peeled off so that the sealing material is attached to the seal region through the adhesive layer.

However, the attaching method as described above has various problems in that it involves the trouble of first applying a double coated tape to a fixed form sealing material. Double coated tapes are expensive. Further, costs for attaching are incurred. After use, the release paper becomes a waste material, which must be disposed of and thus causing the problem of disposal thereof. The punching of a sealing material from a plate-like sealing material results in the occurrence of punching loss. Because both the sealing material and double-coated tape are used, it is difficult to separate them for subsequent recycling. As a result, the disposal of waste becomes very difficult. In addition, the total cost is very high.

With a view to solve these problems, it has been proposed to integrally mold a pressure sensitive adhesive together upon producing a sealing material to eliminate the cumbersome procedure of attaching the double coated tape. However, even this method is not free of the problems of disposal of waste release paper and punching loss.

On the other hand, a method of applying a sealing material to the seal region with a solvent type or aqueous type adhesive may be used. However, this method has problems in actual application in that it takes a long time for drying the solvent or water, or the material used has odor. Further, when using aqueous adhesives, there will occur a considerable decrease in waterproofness and moistureproofness after the application of a fixed form sealing material. If the article to be sealed is washed with water after the application of a fixed form sealing material as in the case of hard disk drive (HDD) casing, the bonded portion is vulnerable to water and tends to be peeled off.

To alleviate the aforementioned defects of the adhesive, a hot-melt adhesive may be used in bonding a fixed form sealing material to the seal region. However, the conventional hot-melt adhesive can be coated either to the fixed form sealing material or to the seal region, and in each case the timing in which the fixed form sealing material cab be bonded is extremely limited the adhesive tends to be cooled readily. Where the fixed form sealing material is a foamed material, the situation might be worsened since the bonded surface is uneven or with protrusions and depressions, so that sufficient bonding area cannot be reserved; as a result, the bonding is difficult and tends to cause a problem. This is also the case where the seal region is "wood material" that has likewise many protrusions and depressions so that bonding is difficult to achieve and proper timing for bonding is difficult to be determined.

Even if a hot-melt adhesive is used, the difficulty in determining the proper timing for bonding remains since the conventional hot-melt adhesive or pressure-sensitive adhesive has high viscosity so that it must be coated at a high temperature and the viscosity increases greatly after the coating.

In addition, the conventional hot-melt adhesive has the defect specific thereto that in summer seasons, while parts with the sealing material attached thereto are being stored in a warehouse, the fixed form sealing material bonded could be peeled off.

Further, if a fixed form sealing material is bonded between the casing and lid of a hard disk drive (HDD) casing with a conventional hot-melt adhesive containing a tackifier and a large amount of an oil component in order to prevent a decrease in viscosity, these components generate gases, which contaminate the HDD and cause a trouble.

SUMMARY OF THE INVENTION

Under the circumstances, the present invention has been made to solve the aforementioned problems of the conventional sealing structure and an object of the present invention is to provide a sealing structure that can be easily applied and does not use any double coated tape, causes no problem in disposal of wastes, highly waterproof and causing no decrease in waterproofness nor moistureproofness upon washing, generates no gas that could adversely affect the member to be sealed, and is inexpensive.

To achieve the aforementioned object, according to a first embodiment, the present invention provides a sealing structure for sealing a region of an article to be sealed, characterized by comprising a fixed form sealing material bonded to the region with an isocyanate group containing reactive polyurethane hot-melt adhesive.

In a second embodiment, the present invention provides a sealing structure for sealing a region of an article to be sealed, characterized by comprising a sealing member comprising a thin substrate for attachment and a fixed form sealing material bonded to said substrate with an isocyanate group containing reactive polyurethane hot-melt adhesive, said sealing material being airtight and waterproof or airtight and moistureproof, and said region having provided thereon said sealing member.

Here, the reactive polyurethane hot melt adhesive may have a contact angle of 90° or more.

The fixed form sealing material may have a contact angle of 90° or more.

The fixed form sealing material may comprise at least one material selected from the group consisting of polyurethane foam, polyurethane nonfoam, EPDM foam and EPDM nonfoam.

The region to be sealed may be a region between a box and a lid of a hard disk drive casing.

DETAILED DESCRIPTION OF THE PREFERRED EMBODIMENETS

Hereinafter, one embodiment of the present invention will be described in detail with reference to the attached drawings.

Figure 1:
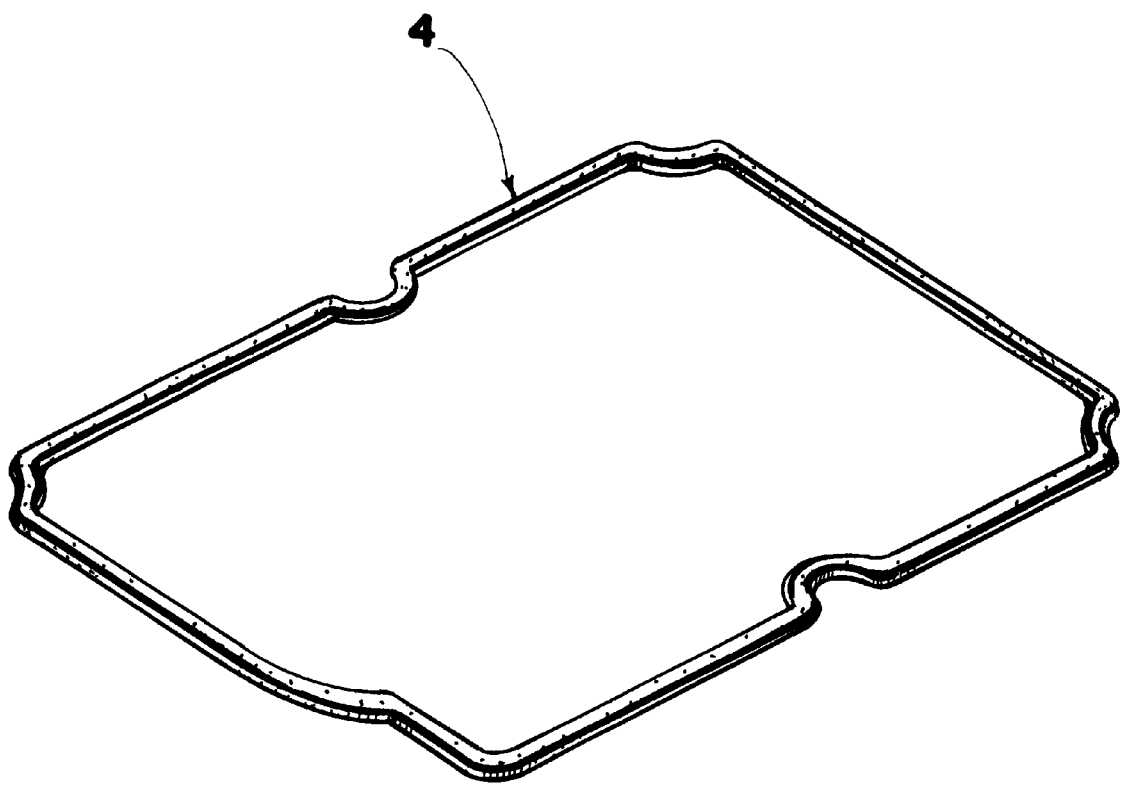
FIG. 1 is a perspective view showing a fixed form sealing material according to one embodiment of the present invention.
Figure 2:
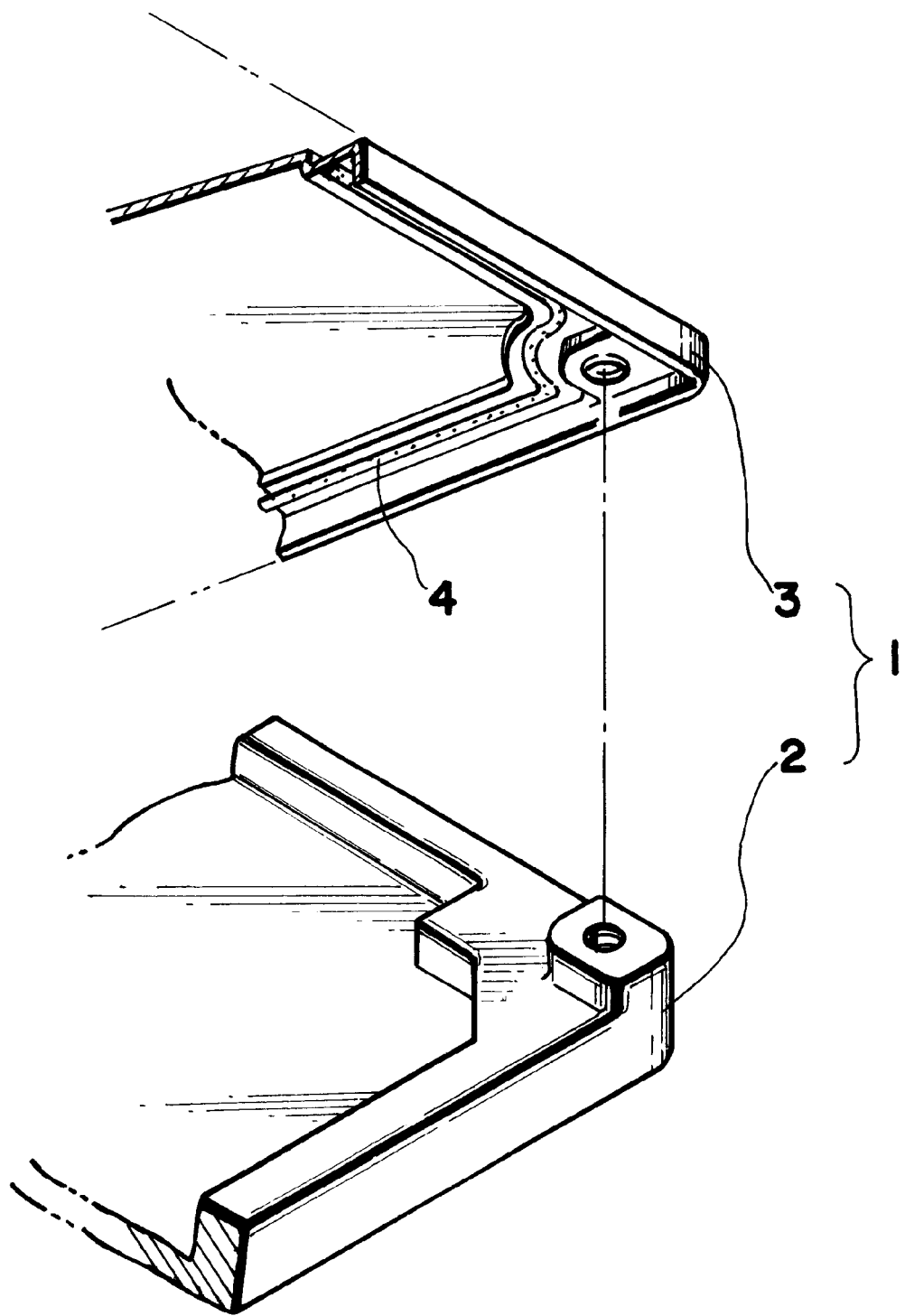
FIG. 2 is a perspective view showing a fixed form sealing material according to one embodiment of the present invention, bonded to a seal region between the box and lid of a hard disk drive casing.
Figure 3:
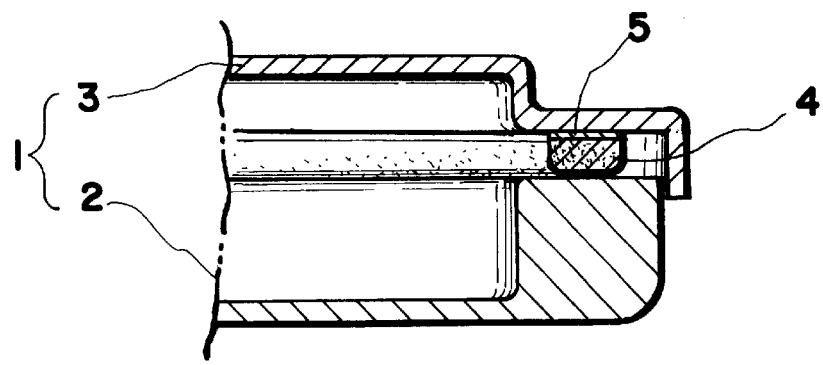
FIG. 3 is a cross-sectional view showing a fixed form sealing material according to one embodiment of the present invention bonded to a seal region between the box and lid of a hard disk drive casing.
Figure 4:
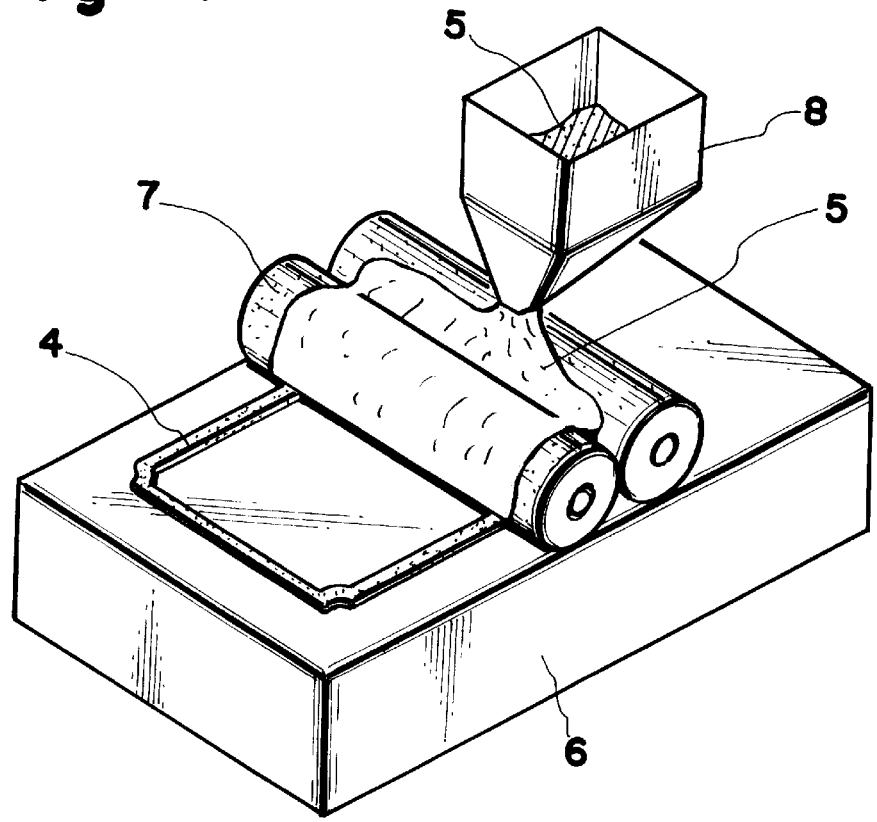
FIG. 4 is a perspective view illustrating an example of coating a reactive polyurethane hot-melt adhesive.

FIG. 1 is a perspective view of a fixed form sealing material according to one embodiment of the present invention. FIG. 2 is a perspective view of a fixed form sealing material bonded to a seal region between the box and lid of a hard disk drive casing. FIG. 3 is a cross-sectional view of a fixed form sealing material bonded to a seal region between the box and lid of a hard disk drive casing. FIG. 4 is a perspective view illustrating an example of coating a reactive polyurethane hot-melt adhesive.

A hard disk drive casing (hereinafter, referred to as HDD casing) 1 comprises a box 2 and a lid 3. Around the inner surface of the lid 3 is provided a fixed form sealing material 4 as bonded with an isocyanate group containing reactive polyurethane hot melt adhesive 5. As shown in FIG. 3, the HDD casing has the box 2 and the lid 3 abutted to each other through the fixed form sealing material 4 to seal the inside of the box 2 from the outside of the HDD casing 1.

The fixed form sealing material 4 comprises polyurethane foam or nonfoam molded into a predetermined shape or molded into a plate-like shape and then punched into a predetermined shape. FIG. 1 shows an example of such.

The fixed form sealing material 4 is bonded with an isocyanate group containing reactive polyurethane hot-melt adhesive 5. The fixed form sealing material 4 is bonded by coating the reactive hot-melt adhesive 5 to one surface of the fixed form sealing material 4 and applying the material 4 to the inner surface of the lid 3.

FIG. 4 illustrates an example of coating the adhesive 5 to one surface of the fixed form sealing material 4. As illustrated, the fixed form sealing material 4 is fixed to a jig 6 and the reactive polyurethane hot-melt adhesive 5 is supplied to a coating roller 7 from a hopper 8. Then, the reactive hot-melt adhesive 5 is coated on one surface of the fixed form sealing material 4 using the coating roller 7. On this occasion, the coating roller 7 is rotated and the coating roller 7 or the jig 6 is moved. The rotating apparatus and moving apparatus used here may be conventional ones.

In the aforementioned embodiment, the reactive hot-melt adhesive 5 is coated on the fixed form sealing material 4. However, the present invention is not limited thereto. The reactive hot-melt adhesive 5 may also be coated on a member to be sealed to bond a fixed form sealing material.

Figure 5:
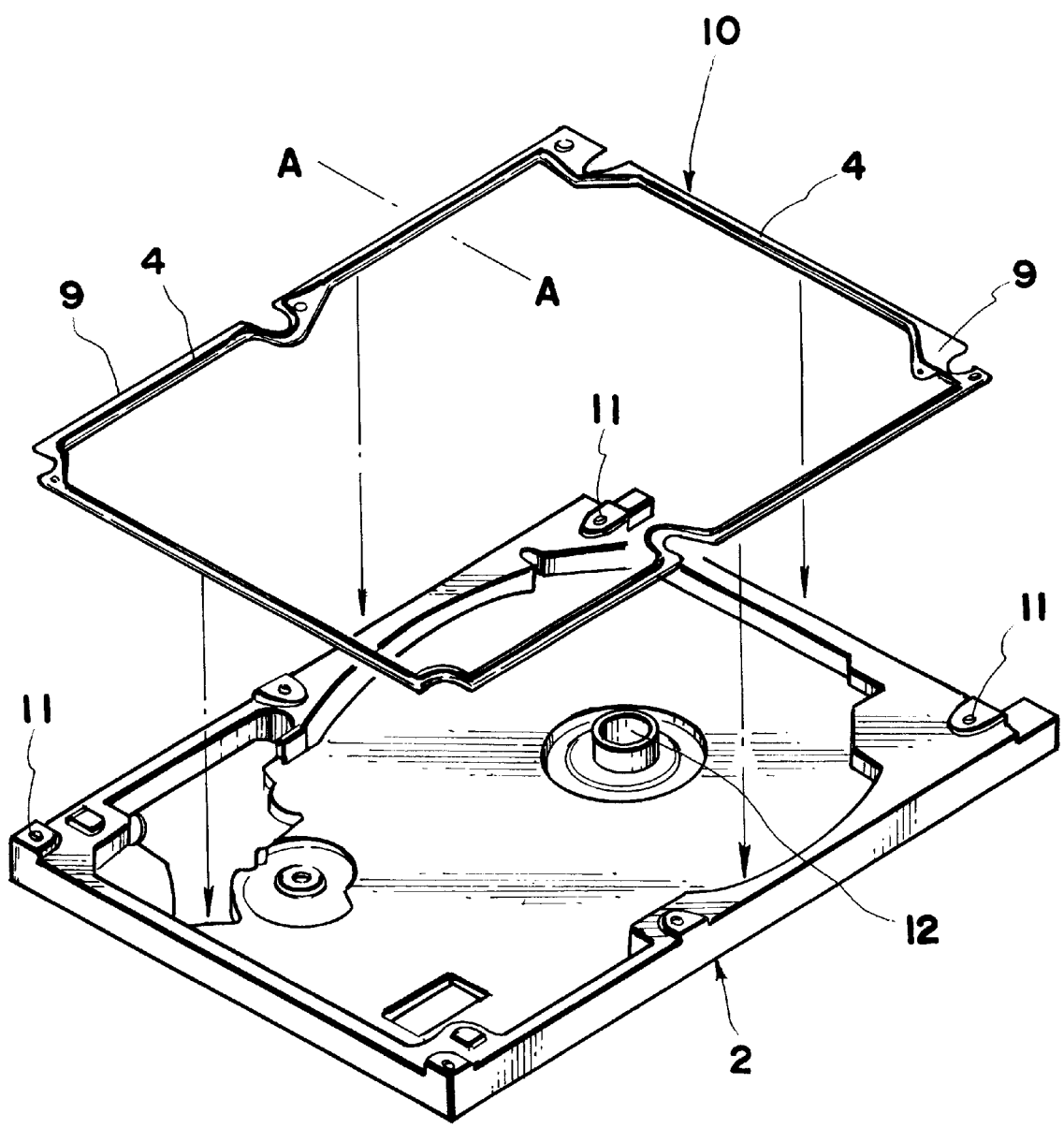
FIG. 5 is a perspective view showing the box of a hard disk drive casing and a sealing member according to another embodiment of the present invention.
Figure 6:
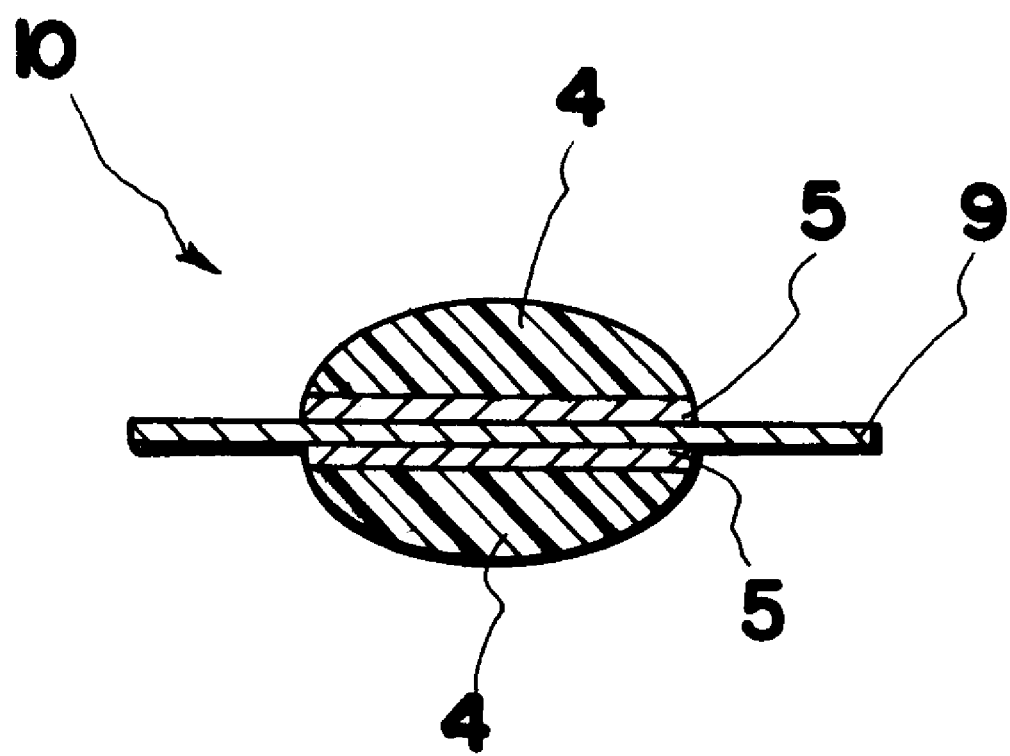
FIG. 6 is a cross-sectional view of the hard disk drive casing along the line A—A in FIG. 5.

FIG. 5 is a perspective view showing the box of a hard disk drive casing and a sealing member according to another embodiment of the present invention and FIG. 6 is a cross-sectional view of the hard disk drive casing along the line A—A in FIG. 5. According to this embodiment, a sealing member 10 that has a thin substrate for attachment (hereinafter, referred to as an attaching substrate) 9, for example, an aluminum plate having bonded thereto the fixed form sealing material 4 with the isocyanate group containing reactive polyurethane hot-melt adhesive 5. That is, as shown in FIG. 6, the sealing member 10 is formed by bonding the fixed form sealing material 4, which is airtight and waterproof, or airtight and moisture proof, to the attaching substrate 9 with the isocyanate group containing reactive polyurethane hot-melt adhesive 5. In this embodiment, the fixed form sealing material 4 is bonded onto the both surfaces of the attaching substrate 9. The sealing member 10 is fixed to a seal region, for example, to the peripheral portion of the box 2 of HDD casing as shown in FIG. 5. This structure seals the inside of the box 2 from the outside thereof.

In FIG. 5, reference numeral 11 stands for a screw hole, 12 stands for a bearing portion for supporting a HDD driving motor axle. The HDD is not shown for simplifying the explanation.

As described above, the present invention is to realize sealing using a sealing material having high airtight and waterproof or moistureproof properties and a reactive hot-melt adhesive in order to solve the problems of the prior art upon attaching a fixed form sealing material to render a seal region airtight and waterproof or moistureproof.

Accordingly, the reactive hot-melt adhesive must satisfy waterproof property required for seal and moistureproof property under severe environment, for example high temperature (100° C. or less) and high humidity (90% or more).

Therefore, the reactive hot-melt adhesive, inclusive of a pressure-sensitive adhesive, of the present invention preferably has the following characteristics:

(1) The adhesive is a reactive polyurethane hot-melt adhesive containing an isocyanate group.

(2) The reactive polyurethane hot-melt adhesive has a contact angle of 90° or more.

The fixed form sealing material preferably has the following characteristics:

(1) It is a polyurethane foam or nonfoam, or EPDM foam or nonfoam.

(2) It is of a waterproof or moistureproof type having a contact angle of 90° or more.

Hereinafter, the polyurethane reactive hot-melt adhesive, one of the important constituent elements of the working structure for attaching a fixed form sealing material of the present invention will be explained in detail.

(2) The reactive hot-melt adhesive (hereinafter, abbreviated as RHA) is a urethane polymer having an isocyanate terminal. It has a NCO content (%) of usually about 0.1 to about 5% and is coated after melting it at about 80 to about 150° C. Simultaneously with the coating, initial adhesive force is generated due to cohesive force and the adhesive force further increases due to its reaction with the moisture in the air after the coating. The adhesive used in the invention is preferably the one which reacts and solidifies to develop a three-dimensional structure upon reaction and solidification.

(2) RHA can be produced by reacting a polyol such as polyether-polyol, polyester-polyol or hydrocarbon based polyol with a diisocyanate such as MDI to form a prepolymer having an isocyanate terminal. In most cases, polyol species having a molecular weight of 1,000 or less are used for rendering it moisture-sensitive and polyester-polyols having high degree of crystallinity.

(3) Upon synthesizing polyester-polyol, the resulting RHA tends to have an increased contact angle by introducing an aromatic nucleus to the molecule, for example, by using phthalic acid as the acid component. The contact angle may be further increased by using dimeric acid as the acid component of the polyester-polyol.

(4) Use of a carbon backbone structure as the polyol component is preferred since it results in an increased contact angle. To introduce such a carbon backbone structure, polybutadiene polyol, polyisoprene polyol, hydrogenated products of these diene-based polyols, dimer diol obtained by hydrogenation of dimeric acid, castor oil based polyols and the like as well as the aforementioned polyesters using dimeric acid can be used.

(5) Since the viscosity increases as soon as RHA is coated, the adhesive component is difficult to be impregnated in the sealing material or gasket material. Accordingly, the flexibility of the foam is not damaged and its resilience or recovering the original shape can be maintained.

(6) RHA can be coated at relatively low temperatures sot that the bonded product will suffer less degradation and can be maintained in as state where the contact angle is large.

When the target member to which the fixed sealing material is applied is limited to a HDD gasket, use of the reactive hot-melt adhesive according to the present invention readily enables the following coating working.

a) Coating method
  (1) Dispenser method
  (2) Stamp method
  (3) Roller method
  (4) Brush method
  (5) Die method
b) The portion coated with RHA can be
  (1) point coated, or
  (2) entirely coated
by controlling the thickness of the coating.

EXAMPLES

Hereinafter, the present invention will be described in more detail by examples. However, the present invention is not limited thereto. In the examples, all % are by weight.

Example 1

A composition composed of 100 g of polybutadiene-polyol (PolybdR45HT: OH equivalent of 0.82 meq/g, produced by Idemitsu Petro-Chemical) as the polyol component and 62.13 g of diphenylmethane diisocyanate as the isocyanate component and 14.9 g of 1,4-butanediol was reacted at 80° C. for 3 hours to prepare a hot-melt adhesive having a NCO % of 1.7%.

The adhesive was coated on one surface of a urethane foam sealing material (Superseal WB: a waterproof sealing material having a density of 0.052 g/cm$^3$ and a contact angle of 95°, produced by NHK Spring Corp.), followed by waterproof tests.

As Comparative Example 1, the adhesive was prepared in the same manner as in Example 1 except that 100 g of polyether-polyol (GP3000: OH equivalent of 1.0 meq/g, produced by Sanyo Kasei) was used and the resulting adhesive was used for the waterproof tests.

The results of waterproof tests are shown in Table 1 below.

TABLE 1

|  | Blank (no adhesive) | Example 1 | Comparative Example 1 |
| --- | --- | --- | --- |
| Contact angle (°) after curing of adhesive |  | 95 | 70 |
| Waterproof hydraulic pressure (cm) immediately after bonding | 15 | 10 | 0 |
| Waterproof hydraulic pressure after 1 day | 15 | 15 | 2 |

Use of the adhesive prepared according to Example 1 exhibited waterproof property to some extent immediately after the bonding with the adhesive. After 1 day, the waterproof property recovered entirely and no influence due to non-curing of the adhesive was observed.

On the other hand, according to Comparative Example 1, the waterproof property did not recover after 1 day.

The above results demonstrate that greater contact angle given by the adhesive corresponds to higher waterproof property and vice versa.

Example 2

A composition composed of 100 g of hydrogenated polybutadiene-polyol (Polyther HA: OH equivalent of 0.877 meq/g, iodine number of 4.2, produced by Mitsubishi Chemical Corp.) as the polyol component, 32.92 g of diphenylmethane diisocyanate as the isocyanate component and 23.79 g of α-olefin glycol (OH equivalent of 5.529 meq/g, produced by Daicel Chemical Ind.) was reacted at 80° C. for 3 hours to prepare a hot-melt adhesive having a NCO % of 1.0%.

The adhesive was coated on one surface of a urethane based HDD gasket material (Nipparray EX: density of 0.55 g/cm$^3$ and contact angle of 95°, produced by NHK Spring Co.) to a thickness of about 50 micron (μm) and the gasket material was fitted to the lid of an HDD apparatus.

Comparative Examples 2 to 5

In the same manner as described in the foregoing examples, other adhesives were each coated on one surface of a gasket material to prepare samples. The adhesives used were SBS based adhesive (Comparative Example 2), synthetic rubber based solvent type adhesive (Comparative Example 3), acrylic emulsion based adhesive (Comparative Example 4), and epoxy based adhesive (Comparative Example 5).

The samples were subjected to general tests including assembling workability, gas emergence, and moisture permeation and evaluated. Table 2 shows the results.

TABLE 2

|  | Example 2 | Comparative Example 2 | Comparative Example 3 | Comparative Example 4 | Comparative Example 5 |
| --- | --- | --- | --- | --- | --- |
| Contact angle (°) | 98 | 95 | 85 | 80 | 85 |
| Assembling workability | Excellent | Excellent | Solvent does not dry | Does not dry | Long curing time |
| Gas emergence | Excellent | Much oil emerged | Solvent, etc. emerged | Water, etc. emerged | Excellent |
| Moisture permeation | Excellent | Excellent | Poor | Poor | Excellent |
| General evaluation | ⊚ | x | x | x | x |

SBS based adhesive (Comparative Example 2), a commonly used hot-melt adhesive, contains a large amount of oil component in order to lower viscosity, and the oil component, emerges as gas emergence portion.

The solvent type (Comparative Example 3) and aqueous adhesive (Comparative Example 4) take a long time for drying and need volatilization of the solvent or evaporation of water so that the workability is poor. Gas emergence is a failure factor since the comparative samples contain a large amount of impurities. Furthermore, the epoxy based adhesive (Comparative Example 5) takes a long time for curing.

In the foregoing description, the present invention has been explained as using an adhesive for bonding the fixed form sealing material. However, the present invention is not limited to using an adhesive and it also includes use of a tackiness.

As described above, according to the present invention, the isocyanate group containing reactive polyurethane hot-melt adhesive on the surface of the fixed form sealing material or of the sealing member so that it can exhibit the following advantageous effects.

(1) Since no adhesive tape such as a double-coated tape is used, the adhesive must be coated on only the portion that is used. Therefore, no adhesive is wasted in vain but exhibits good workability. In addition, the trouble of applying a double-coated tape to the fixed form sealing material is eliminated and no cost is incurred therefor. No waste release paper is produced so that no care must be taken for disposal thereof.

(2) The present invention is free of the problems encountered in the conventional technique where the fixed form sealing material is punched from a sealing material prepared by applying a double-coated tape to a plate-like material so that punching loss occurs both in the sealing material and double-coated tape. Further, according to the conventional technique, disposal of a mixture of the sealing material and double-coated tape needs fractionation for recycling after use and disposal of wastes causes a difficult problem. Therefore, the total cost for the conventional fixed form sealing material naturally is high. However, according to the present invention, such cost is not incurred and the fixed form sealing material or sealing structure using such can be provided at low costs.

(3) Furthermore, since the present invention uses an isocyanate group containing reactive polyurethane hot-melt adhesive that preferably has a contact angle of 90° or more, and since polyurethane foam or nonfoam or EPDM foam or nonfoam is used as the component of fixed form sealing material that preferably has a contact angle of 90° or more, high airtightness and waterproof property or high airtightness and mostureproof property are realized and such properties will not be decreased even washed with water. The satisfactory properties are obtained in high temperature-high humidity environments.

Since no gas is emerged that gives an adverse influence on the member or region to be sealed, the fixed form sealing material or member of the present invention can be most advantageous to the sealing of the seal region between the box and lid of an HDD casing.

(4) Furthermore, the isocyanate group containing reactive polyurethane hot-melt adhesive used in the present invention can be produced at high throughput and also is inexpensive as compared with the conventional adhesives and tackiness adhesives.

What is claimed is:

1. A sealing structure for hard disk drive casing, comprising a fixed form sealing material bonded to the region between a box and a lid of the hard disk drive casing with an isocyanate group containing reactive polyurethane hot-melt adhesive.

2. A sealing structure for a hard disk drive casing according to claim 1, wherein said reactive polyurethane hot-melt adhesive has a contact angle of 90° or more.

3. A sealing structure for a hard disk drive casing according to claim 1, wherein said fixed form sealing material has a contact angle of 90° or more.

4. A sealing structure for a hard disk drive casing according to claim 1, wherein a contact angle between said fixed form sealing material and said reactive polyurethane hot-melt adhesive is 90° or more.

5. A hard disk drive casing sealing structure, comprising: a box casing region, a lid region and a fixed form sealing material bonded between said box region and said lid region, aid fixed form sealing material having an isocyanate group containing reactive polyurethane hot-melt adhesive.

6. A hard disk drive casing sealing structure according to claim 5, wherein said reactive polyurethane hot-melt adhesive has a contact angle of 90° or more.

7. A hard disk drive casing sealing structure according to claim 5, wherein form sealing material has a contact angle of 90° or more.

8. A hard disk drive casing sealing structure according to claim 5, wherein a contact angle between said fixed form sealing material and said reactive polyurethane hot-melt adhesive is 90° or more.

* * * * *